(12) United States Patent
Gailledrat

(10) Patent No.: US 8,350,562 B2
(45) Date of Patent: Jan. 8, 2013

(54) DEVICE WITH CONTACTLESS ADJUSTMENT MEANS

(75) Inventor: Joel Gailledrat, Champniers (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 588 days.

(21) Appl. No.: 12/332,748

(22) Filed: Dec. 11, 2008

(65) Prior Publication Data
US 2009/0160587 A1   Jun. 25, 2009

(30) Foreign Application Priority Data
Dec. 19, 2007 (FR) ..................................... 07 59970

(51) Int. Cl.
*G01B 7/30* (2006.01)
(52) U.S. Cl. ............. 324/207.25; 324/207.21; 335/205
(58) Field of Classification Search ............. 324/207.2, 324/207.21, 207.22, 207.23, 207.25; 335/151–154, 335/207, 205
See application file for complete search history.

(56) References Cited

U.S. PATENT DOCUMENTS

| | | | | |
|---|---|---|---|---|
| 4,199,741 A | * | 4/1980 | Serrus Paulet | 335/206 |
| 4,691,185 A | * | 9/1987 | Loubier et al. | 338/32 H |
| 5,097,209 A | * | 3/1992 | Santos | 324/207.2 |
| 5,313,159 A | * | 5/1994 | Allwine, Jr. | 324/207.2 |
| 6,246,333 B1 | * | 6/2001 | Doner et al. | 340/686.1 |
| 6,556,005 B1 | * | 4/2003 | Oomkes | 324/207.2 |
| 7,292,028 B2 | * | 11/2007 | Hahn | 324/207.25 |
| 7,449,878 B2 | * | 11/2008 | Lee | 324/207.23 |
| 8,134,431 B2 | * | 3/2012 | Mozer et al. | 335/207 |
| 2003/0173954 A1 | * | 9/2003 | Terui et al. | 324/207.21 |
| 2008/0024044 A1 | * | 1/2008 | Palmer et al. | 310/68 R |
| 2008/0054886 A1 | * | 3/2008 | Uemura et al. | 324/207.2 |
| 2008/0164866 A1 | * | 7/2008 | Steinich et al. | 324/207.2 |
| 2008/0174301 A1 | * | 7/2008 | Mattson | 324/207.2 |
| 2009/0128139 A1 | * | 5/2009 | Drenth et al. | 324/207.22 |

FOREIGN PATENT DOCUMENTS

| | | |
|---|---|---|
| DE | 10 2005 032 032 A1 | 1/2007 |
| FR | 2 804 240 A1 | 7/2001 |
| GB | 2 332 395 A | 6/1999 |
| WO | WO 97/16123 | 5/1997 |

* cited by examiner

*Primary Examiner* — Arleen M Vazquez
(74) *Attorney, Agent, or Firm* — Oblon, Spivak, McClelland, Maier & Neustadt, L.L.P.

(57) ABSTRACT

A device including: an actuation unit that is a rotatable ring including a permanent magnet affixed to an inner periphery of the ring, wherein the ring is capable of assuming several predetermined angular positions and the permanent magnet moves with the ring; an integrally closed enclosure on which the actuation unit is mounted enabling adjustment of a parameter or operating mode of the device, wherein the ring surrounds the enclosure; one or more sensors that can be guided by magnetic effect according to an angular position of the ring, each sensor being capable of sending at least one signal corresponding to a modification of the parameter or of the operating mode of the device; and means for processing each signal and for changing the parameter or the operating mode of the device depending on each signal.

18 Claims, 3 Drawing Sheets

DEVICE WITH CONTACTLESS ADJUSTMENT MEANS

The present invention relates to a device comprising at least one actuation unit allowing manual adjustment of a parameter or an operating mode.

Currently, devices such as detectors, for example optical detectors, must be set up by manually adjusting their operating mode and some of their parameters. The parameters to be adjusted are, for example, a threshold value or a range value while the operating mode to be adjusted is, for example, reflex mode or proximity mode. In order to set up an adjustable parameter or an operating mode, some detectors use, for example, a push-button present on the enclosure of the product. The button is directly connected to release mechanisms present in the enclosure of the detector. The enclosure of the detector therefore has an opening through which the button is activated, this opening disrupting the sealing of the enclosure of the detector. Sealing of the detector may then be obtained, for example, by injecting a resin into the enclosure of the product. However, this sealing cannot be perfect due to the presence of the opening formed in the enclosure to accommodate the button. An O-ring is indeed used to ensure sealing of the button in its opening, but this solution remains inadequate, as the ring is small in size, fragile and difficult to position.

From document WO 97/16123 a switching device is known comprising an outer enclosure on which several buttons are positioned. Each button holds a permanent magnet capable of controlling a Hall-effect or reed sensor located inside the enclosure. This device has the drawback of requiring a distinct button and several magnets for its operation and its parameter setting.

The aim of the invention is to propose a device equipped with a manual parameter-setting solution that is straightforward and does not compromise its sealing.

This aim is achieved by a device comprising an integrally closed enclosure on which an actuation unit is mounted enabling the adjustment of a parameter or operating mode of the device, the device comprising a permanent magnet driven in its movement by the actuation unit, characterized in that:
  the actuation unit is a rotating ring bearing the permanent magnet and capable of assuming several predetermined angular positions;
  the device comprises one or more sensors that can be guided by magnetic effect according to the angular position assumed by the rotating ring, each sensor being capable of sending at least one signal corresponding to a modification of the parameter or of the operating mode of the device;
  the device comprises processing means for processing each signal and for changing the parameter or the operating mode of the device depending on each signal.

According to the invention, the contactless adjustment means of the device enable its straightforward adjustment without requiring any opening through its enclosure. This is because, due to the sensors used in the invention, no opening is formed through the enclosure of the device. Sealing may, for example, be ensured by injecting a resin inside the enclosure of the device by centrifugation. In addition, the elimination of conventional parameter-setting buttons enables assembly steps to be eliminated and therefore the manufacturing cost of the device to be reduced.

According to a first embodiment of the invention, each sensor is of the on/off type.

According to this first embodiment, the signal sent by each sensor corresponds, for example, to a value of the parameter or to a particular operating mode of the device and for each of its positions the magnet activates a single sensor.

According to this first embodiment, the signal sent by each sensor corresponds, for example, to an incrementation or decrementation of the parameter or to a change in the operating mode. In this configuration the device comprises a first sensor capable of sending a first signal representing an incrementation of the parameter and a second sensor capable of sending a second signal representing a decrementation of the parameter.

According to a second embodiment, each sensor has two active states for sending two distinct signals representing two distinct values of the parameter or two distinct operating modes of the device.

According to a first configuration, the sensors are, for example, of the Hall-effect type.

According to a second configuration, the sensors are magnetic microswitches of the MEMS type.

According to a third configuration, the sensors are reed switches.

According to a particular feature of the invention, the device comprises means for locking/unlocking the actuation unit.

The device of the invention will be, for example, a detector.

Other features and advantages will become apparent in the following detailed description, referring to an embodiment provided by way of example and shown by the appended drawings, in which.

Figure 1:
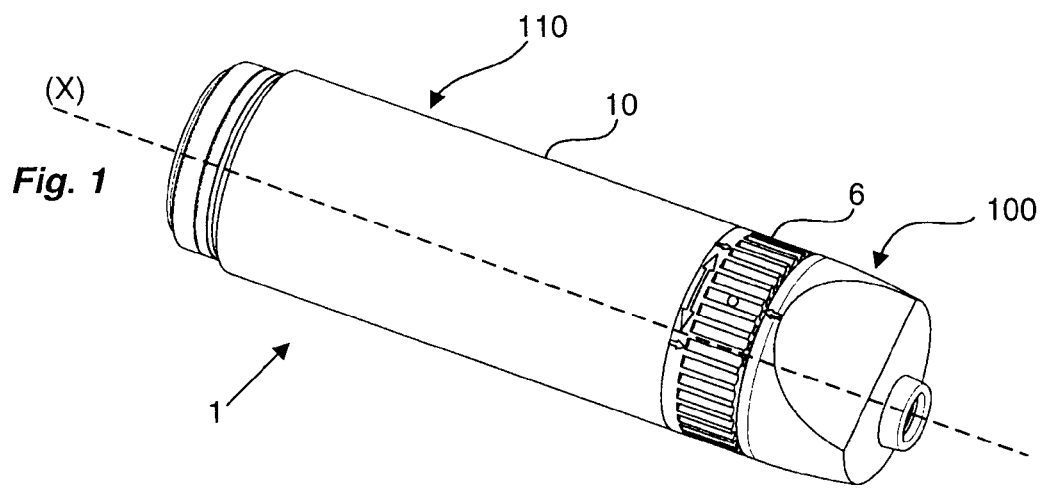
FIG. 1 shows an example application of the invention.

The invention relates to a device that comprises means for adjusting a parameter or an operating mode such as, for example, a detector 1 or a circuit breaker. In the circuit-breaker case this involves, for example, adjusting the rating, whereas in a detector 1 it involves, for example, adjusting a parameter such as a threshold value or a range value or an operating mode such as reflex mode, proximity mode, or proximity mode with background suppression. The following description applies to a detector 1, but it should be understood as being applicable to any other type of device requiring adjustment.

A detector 1 comprises an enclosure 10, for example cylindrical and integrally closed, enclosing means for transmitting and/or receiving a signal and processing means 50 for processing the signal received, such as a microprocessor. The processing means 50 are also connected to storage means 51 for storing the detector parameter or its operating mode. In the majority of detectors, these parameters and/or operating mode must be manually adjusted by the user. According to the invention, such adjustment can, for example, be carried out using one or more cursors, one or more adjustment rings and/or one or more rotary discs mounted on the detector enclosure.

The following description applies to a detector with parameter setting using an adjustment ring 6. However, it should be understood that the features defined below may be fully implemented for a detector that can be set up using an adjustment cursor or a rotary disc mounted on the enclosure 10 of the detector.

With reference to FIGS. 1 to 5B, the cylindrical enclosure 10 of the detector has a front part 110 carrying in particular means for transmitting/receiving a signal and a rear part 100 capable of being fixed to the front part and comprising in particular the processing means 50. The rear part 100 comprises an end fitting 101 extended by a cylindrical area 102 forming a shoulder 103 with the end fitting 101. An adjustment ring 6 allowing, for example, adjustment of a parameter or definition of an operating mode of the detector is mounted coaxially around the cylindrical area 102. The ring has, on the one hand, axial translational travel between the shoulder 103 and the end of the front part 110 of the enclosure 10 so as to be able to assume two predetermined axial positions and is, on the other hand, mounted so as to rotate about the axis (X) of the detector 1. In turning, the ring 6 enables selection of a parameter value or an operating mode of the device. To do this, the ring 6 comprises several indices 60 able to be positioned opposite a fixed index 104 produced on the front part 110 of the enclosure 10. Of course, the inverse may be carried out, with a single index on the ring 6 and several corresponding indices on the enclosure 10 of the detector 1. In addition, according to the invention the detector 1 comprises means for locking the ring 6 to block it rotationally once the adjustment has been carried out. These locking means take, for example, the form of several orifices 61 (FIG. 5A) distributed over a part of the circumference of the ring 6 and capable of cooperating with a fixed stud 105 formed on the shoulder 103 of the rear part 100 of the detector 1. Each orifice 61 corresponds to a predetermined angular position of the ring 6. Once the adjustment of the parameter or of the operating mode has been carried out, it suffices, for locking the ring, to translate the ring 6 from a first axial position to a second axial position in which the stud 105 is inserted into a corresponding orifice 61 (see FIGS. 4A to 5B). The ring 6 is then rotationally blocked. The locking of the ring 6 allows in particular the last adjustments made to the detector to be recovered and for these adjustments to be used to establish a diagnostic when the detector breaks down and has to be examined.

According to the invention the adjustment ring 6 comprises a housing 62 (FIG. 3) designed to accommodate a permanent magnet 4. The housing 62 and the permanent magnet 4 are formed so as not to impede the rotation of the ring 6 around the cylindrical area 102 of the enclosure 10. Thus when the ring 6 is rotated, the permanent magnet 4 may assume various positions according to the angular position of the ring 6 in relation to the fixed adjustment index 104.

Figure 2:
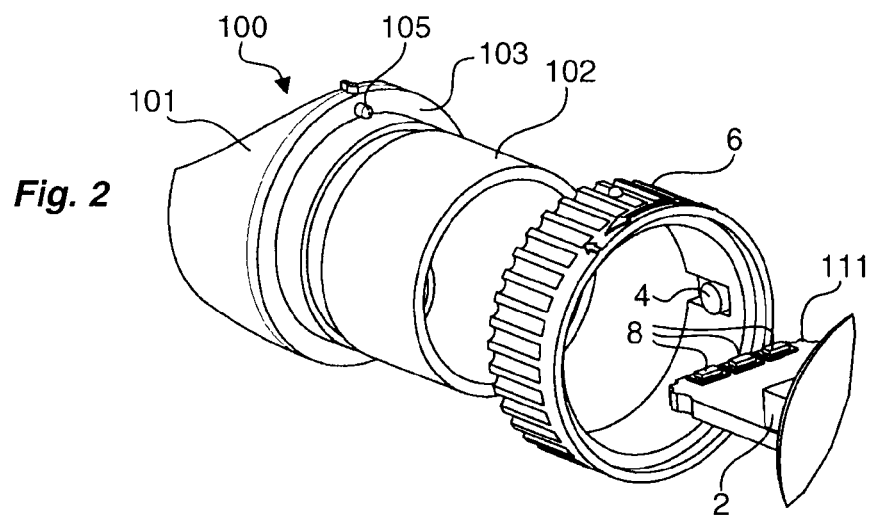
FIG. 2 shows a rear part of a detector on which an adjustment ring is mounted.
Figure 3:
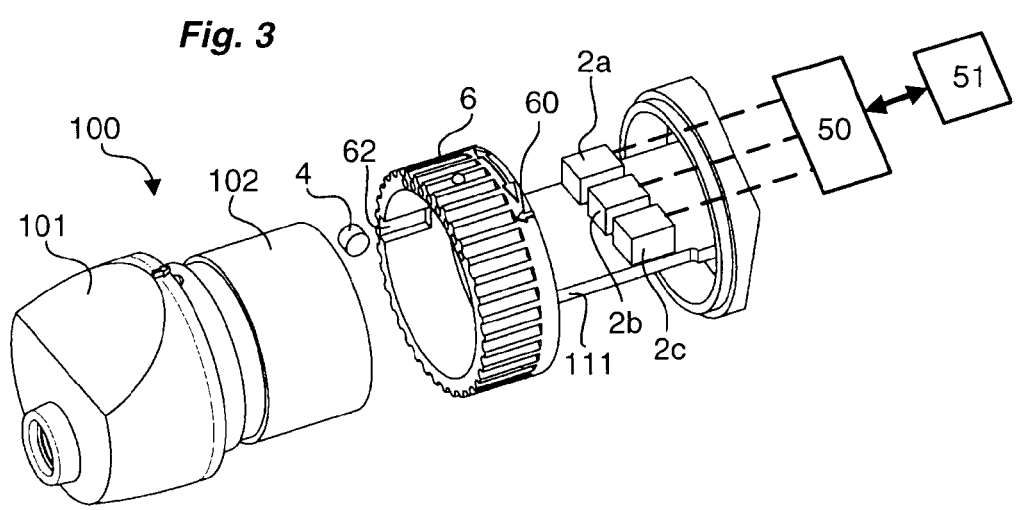
FIG. 3 shows another view of the same elements as FIG. 2.
Figure 4A:
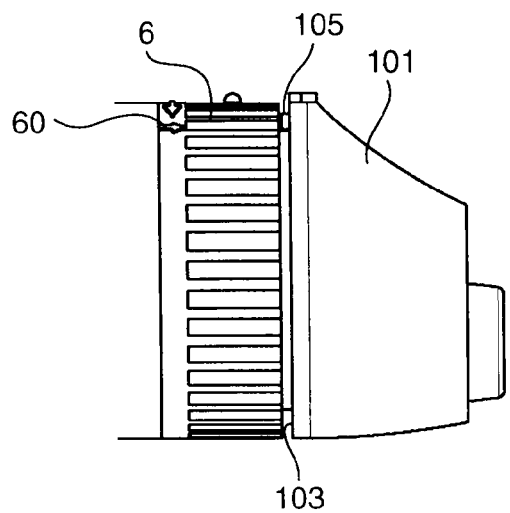
FIGS. 4A and 4B show, in a side-face view, the rear part of the detector and illustrate the two positions assumed by the adjustment ring in the unlocked and locked position respectively.
Figure 4B:
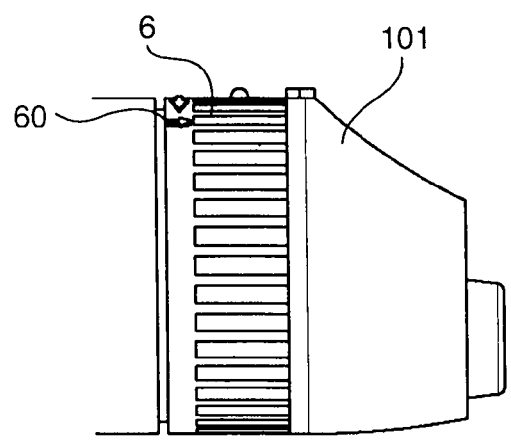
Figure 5A:
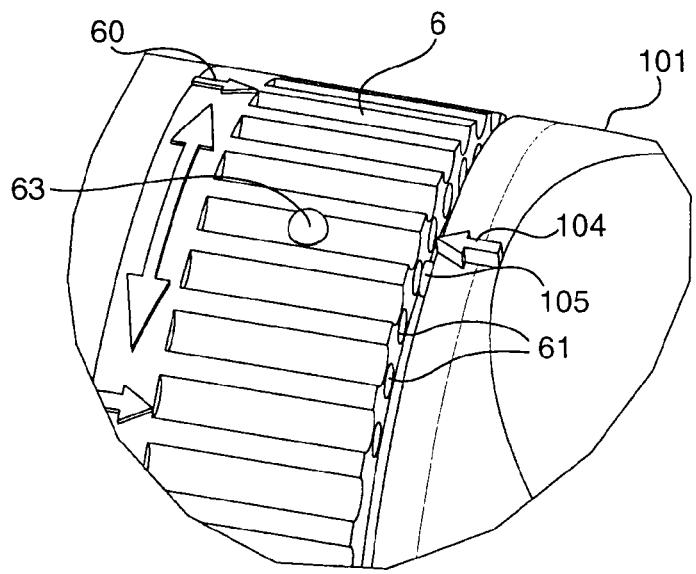
FIGS. 5A and 5B show the adjustment ring in detail, in the unlocked and locked position respectively.
Figure 5B:
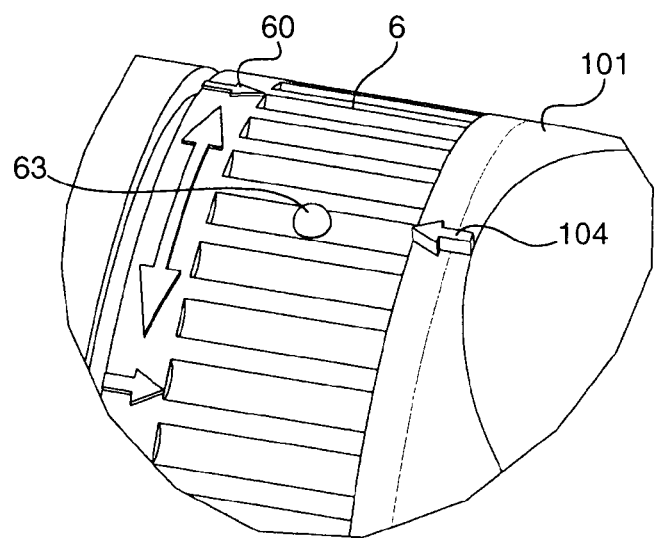

According to the invention, an electronic card 111 is inserted into the front part 110 of the enclosure 10. This electronic card 111 comprises in particular the storage means 51 and the processing means 50 connected on the card 111 to one or more sensors 2a, 2b, 2c (denoted in a general manner as 2) (FIG. 2). These sensors 2 enable detection of the position of the magnet 4 during rotation of the ring 6. Each sensor 2 employed may, for example, be associated with one or more operating modes or with one or more adjustment parameters.

In a first variant embodiment, the sensors 2 are, for example, of the on/off type. They are therefore activated in a certain position of the magnet 4 and deactivated in another position of the magnet 4.

According to the invention, depending on the position of the ring 6 in relation to the indices identifying various parameter values or various operating modes, the magnet 4 assumes different positions and activates one or more sensors 2, each of the sensors 2 activated sending a signal to the processing means 50. Depending on the signal(s) received, the processing means 50 set the detector 1 to the parameter value or to the operating mode of the detector corresponding to the position of the ring 6. In the simplest configuration, each sensor 2 activated may send a signal corresponding to a particular parameter value or operating mode of the detector 1. In this configuration, depending on the sensor 2 activated by the magnet 4, the parameter value or the operating mode corresponding to this sensor 2 is set in the detector 1. Light emitting diodes 8 (FIG. 2) mounted on the card 111 are lit according to the operating mode or the parameter selected with the adjustment ring 6. A window 63 made in the ring 6 then allows the user to see the lit diode corresponding to the operating mode or the parameter selected.

In another configuration (not shown), the detector 1 may comprise, for example, two sensors 2, a first sensor intended to send a signal corresponding to an incrementation of the stored parameter and a second sensor intended to send a signal corresponding to a decrementation of the parameter. The first sensor may also be employed for shifting the detector from one operating mode n to an operating mode n+1 while the second sensor may be employed for shifting the operating mode n to the operating mode n−1. In this other configuration, the adjustment ring is, for example, mounted on a spring returning it to a median position so as to be able to turn on both sides of this median position in order to increment/decrement the parameter or change the operating mode. Two indices are produced on the detector in order to mark the two fleeting positions of the ring.

Figure 6:
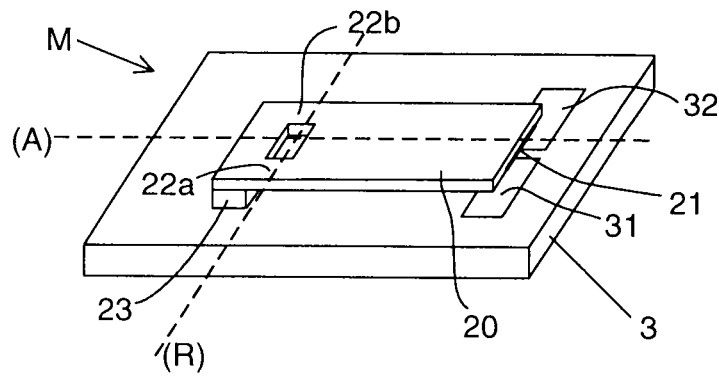
FIGS. 6 to 8 show a magnetic microswitch capable of being used as a sensor in the device of the invention.
Figure 7:
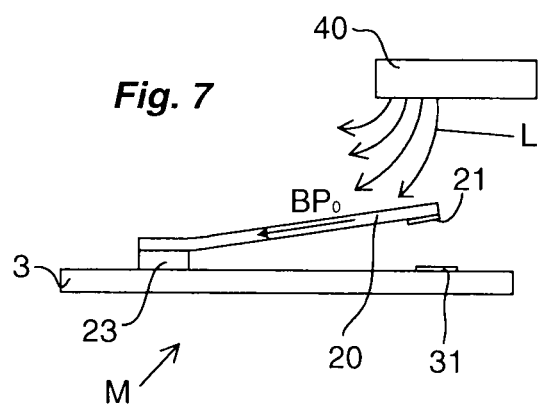
Figure 8:
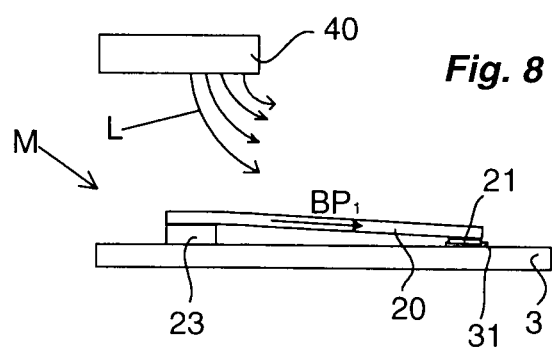

The sensors 2 are, for example, Hall-effect sensors or may be reed sensors. The sensors 2 employed may also be magnetic microswitches M of the MEMS (Micro Electro-Mechanical System) type, as shown in FIGS. 6 to 8. Other types of sensor 2 able to fulfil the same functions may, of course, also be employed.

With reference to FIGS. 6 to 8, a magnetic microswitch M of the MEMS type comprises a mobile element mounted on a substrate 3 manufactured from materials such as silicon, glass, ceramics or in the form of printed circuits. The substrate 3 has, for example, on its surface 30 at least two contacts or strip conductors 31, 32 that are planar, identical and spaced apart, intended to be electrically connected by a movable electrical contact 21 so as to close an electrical circuit. The movable element is composed of a deformable membrane 20 having at least one layer made of ferromagnetic material and bearing the movable contact 21 at one end. The ferromagnetic material is, for example, of the soft magnetic type and may, for example, be an alloy of iron and nickel (permalloy $Ni_{80}Fe_{20}$). The membrane 20 of the microswitch M has a longitudinal axis (A) and is connected at one of its ends by means of connecting arms 22a, 22b to one or more anchor blocks 23 joined to the substrate 3. The membrane 20 is able to pivot in relation to the substrate 3 about a rotation axis (R) perpendicular to its longitudinal axis (A). The connecting arms 22a, 22b form an elastic connection between the membrane 20 and the anchor block 23 and are flexed during pivoting of the membrane 20.

According to the direction of a magnetic component created in the membrane 20, the membrane 20 may assume a low position, called the closed position, in which its movable contact 21 electrically connects the two fixed strip conductors 31, 32 so as to close the electrical circuit, or a high, raised position, called the open position, in which its movable contact 21 is separated from the two strip conductors so as to open the electrical circuit. The magnetic actuation of the microswitch M is more specifically illustrated in FIGS. 7 and 8. It consists in applying a magnetic field created by a permanent magnet 40. According to this mode of actuation, the ferromagnetic membrane 20 moves between its two states by aligning itself on the field lines L of the magnetic field generated by the permanent magnet 40. The magnetic field generated by the permanent magnet 40 indeed has field lines L, the direction of which generates a magnetic component ($BP_0$, $BP_1$) in a ferromagnetic layer of the membrane 20 along its longitudinal axis (A). This magnetic component ($BP_0$, $BP_1$) generated in the membrane 20 gives rise to a magnetic torque forcing the membrane 20 to assume one of its open (FIG. 7) or closed (FIG. 8) positions. By moving the permanent magnet 40, it is therefore possible to subject the membrane 20 to two different orientations of the field lines L of the magnetic field of the permanent magnet 40 and to cause it to toggle between its two positions. This actuation principle can be applied perfectly to the detector 1 of the invention to adjust the parameter or the operating mode of the detector with the help of the magnet 4 carried by the ring 6. In the case of the detector 1 cited as an example of the invention, the permanent magnet 4 effects a movement along an arc of circle. The sensors 2 must therefore be positioned precisely in order to be able to be activated or deactivated in the predetermined angular positions of the magnet 4.

In a second variant embodiment, each sensor 2 is, for example, capable of sending several distinct signals according to the position of the magnet 4. They may be of the Hall-effect type allowing at least two distinct signals to be sent to the processing means 50 depending on the intensity of the magnetic field generated by the permanent magnet 4.

Figure 9:
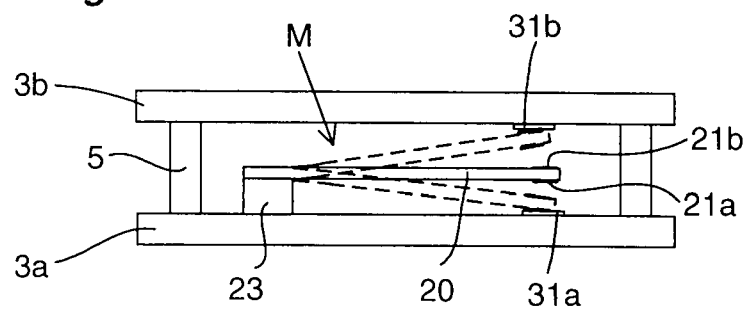
FIG. 9 shows a variant embodiment of the magnetic microswitch shown in FIGS. 6 to 8.

In addition, the magnetic microswitches M described above may be modified in order to send two distinct signals to the processing means 50. FIG. 9 shows such a microswitch. The microswitch is used for the control of two distinct electrical circuits by employing the two positions, high and low, assumed by the membrane 20. According to this configuration, a first substrate 3a bears two electrodes 31a of a first electrical circuit and a second substrate 3b, for example positioned above, parallel to the first substrate 3a, bears two electrodes 31b of a second electrical circuit. The electrodes 31a, 31b are positioned symmetrically relative to the horizontal plane passing through the axis (A) of the membrane 20 of the microswitch. The two substrates are, for example, connected by connecting elements 5. The microswitch according to the invention is joined to at least one of the substrates 3a, 3b. The pivoting membrane 20 also comprises a movable contact 21a, 21b on each of its faces. In its equilibrium position (in solid lines in FIG. 9), the two electrical circuits are open and the membrane 20 is parallel to the two substrates. In a first extreme position (in dotted lines in FIG. 9), the membrane 20 comes into contact with the first electrodes 31a to close the first electrical circuit while in its opposite second extreme position (in dotted lines in FIG. 9), the membrane 20 comes into contact with the second electrodes 31b to close the second electrical circuit. Thus, two distinct signals may be sent to processing means from the same sensor according to the position assumed by the permanent magnet. One or more of these sensors may be mounted on the electronic card 111 depending on the number of adjustable parameter values or the number of available operating modes.

It is obvious that other variants and improvements in detail may be imagined, and even the use of equivalent means envisaged, without departing from the scope of the invention.

The invention claimed is:

1. A device comprising:
   an actuation unit that is a rotatable ring including a permanent magnet affixed to an inner periphery of the ring, wherein the ring is capable of assuming several predetermined angular positions and the permanent magnet moves with the ring;
   an integrally closed enclosure on which the actuation unit is mounted enabling adjustment of a parameter or operating mode of the device;
   one or more sensors that can be guided by magnetic effect according to an angular position of the ring, each sensor being capable of sending at least one signal corresponding to a modification of the parameter or of the operating mode of the device based on a sensed position of the permanent magnet; and
   means for processing each signal and for changing the parameter or the operating mode of the device depending on each signal.

2. The device according to claim 1, wherein each of the one or more sensors is an on/off sensor.

3. The device according to claim 2, wherein the signal sent by each of the one or more sensors corresponds to a value of the parameter or to a particular operating mode of the device and in that for each of the magnet's positions the magnet activates a single sensor of the one or more sensors.

4. The device according to claim 2, wherein the signal sent by each of the one or more sensors corresponds to an incrementation or decrementation of the parameter or to a change in the operating mode.

5. The device according to claim 2, wherein the one or more sensors includes a first sensor that sends a first signal representing an incrementation of the parameter and a second sensor that sends a second signal representing a decrementation of the parameter.

6. The device according to claim 1, wherein each of the one or more sensors has two active states for sending two distinct signals representing two distinct values of the parameter or two distinct operating modes of the device.

7. The device according to claim 1, wherein the one or more sensors are Hall-effect sensors.

8. The device according to claim 1, wherein the one or more sensors are magnetic microswitches.

9. The device according to claim 1, wherein the one or more sensors are reed switches.

10. The device according to claim 1, wherein the ring surrounds the enclosure of the device.

11. The device according to claim 1, further comprising means for locking/unlocking the actuation unit.

12. The device according to claim 1, further comprising a detector.

13. The device according to claim 1, wherein the means for processing is disposed within the enclosure.

14. The device according to claim 1, wherein the ring and the permanent magnet are configured to rotate around the one or more sensors.

15. The device according to claim 1, further comprising:
   fixed studs; and
   a plurality of orifices distributed over a circumference of the ring that mate with the fixed studs to lock the ring in a predetermined angular position.

16. The device according to claim 1, wherein the inner periphery of the ring includes a recess that accommodates the permanent magnet.

17. The device according to claim 1, wherein the permanent magnet is rotatably mounted on an end of the enclosure.

18. A device comprising:
   an actuation unit that is a rotatable ring including a permanent magnet affixed to an inner periphery of the ring, wherein the ring is capable of assuming several predetermined angular positions and the permanent magnet moves with the ring;

an integrally closed enclosure on which the actuation unit is mounted enabling adjustment of a parameter or operating mode of the device, wherein the ring surrounds the enclosure;

one or more sensors that can be guided by magnetic effect according to an angular position of the ring, each sensor being capable of sending at least one signal corresponding to a modification of the parameter or of the operating mode of the device based on a sensed position of the permanent magnet; and a processor that processes each signal and that changes the parameter or the operating mode of the device depending on each signal.

\* \* \* \* \*